United States Patent [19]

Hansen

[11] Patent Number: 4,583,767

[45] Date of Patent: Apr. 22, 1986

[54] PIPE COUPLING

[76] Inventor: Albert F. Hansen, 8 Punga Grove, Whangarei, New Zealand

[21] Appl. No.: 639,913

[22] Filed: Aug. 10, 1984

[51] Int. Cl.$^4$ .............................................. F16L 33/22
[52] U.S. Cl. ...................... 285/40; 285/245; 285/259
[58] Field of Search ................ 285/245, 388, 40, 247, 285/255, 259

[56] References Cited

U.S. PATENT DOCUMENTS

| 265,218 | 9/1882 | Chadwick | 285/245 |
|---|---|---|---|
| 578,983 | 3/1897 | Green | 285/245 |
| 1,446,489 | 2/1923 | Vivarttas | 285/245 X |
| 2,965,395 | 12/1960 | Schmohl et al. | 285/40 |
| 3,287,033 | 11/1966 | Currie | 285/40 |
| 3,520,562 | 7/1970 | Moos | 285/245 X |
| 3,984,130 | 10/1976 | Berger et al. | 285/388 X |

FOREIGN PATENT DOCUMENTS

| 151140 | 11/1951 | Australia | 285/245 |
|---|---|---|---|
| 17139 | of 1913 | United Kingdom | 285/245 |
| 690042 | 4/1953 | United Kingdom | 285/245 |
| 858607 | 1/1961 | United Kingdom | 285/245 |

Primary Examiner—Thomas F. Callaghan
Attorney, Agent, or Firm—Martin Novack

[57] ABSTRACT

A pipe coupling for joining hard-walled, semi-rigid pipe including a tubular portion over which the end of the pipe to be coupled may be engaged. The tubular portion has an external thread carrying a nut including an internal thread. The nut has a second tapered threaded portion adapted to cut a thread into the outside surface of the pipe and to secure the pipe to the coupling.

5 Claims, 6 Drawing Figures

PIPE COUPLING

My present invention relates to a device for coupling pipes, and in particular pipes formed of a substance known as alkathene or polythene. Such pipes generally have a minimum diameter of approximately 15 mm and are utilized for permanent or semi-permanent installations for the transmission of fluids such as water in, for example, irrigation systems or the like. Alkathene and polythene pipes generally have a hard wall and are semi-rigid, and require particular techniques for coupling which are quite distinct from methods of coupling soft walled pipes such as for instance garden hoses and the like. Couplings intended for the coupling of such soft walled pipes are unsatisfactory for the coupling of hardwalled pipes.

In broad terms my invention may be said to comprise a pipe coupling including a tubular portion over which the end of a pipe to be coupled may be engaged, the said tubular portion including an annular boss having an external screw thread carrying a nut having an internal screw thread of a substantially constant pitch whereby the nut is rotatable on the boss so as to be movable onto the exterior of the end of a pipe engaged on the said tubular portion to clamp the pipe onto the said tubular portion, the said nut comprising two concentric bores of different diameters, the bore of lesser diameter being complementarily screw threaded so as to be engagable with said screw threaded annular boss and the bore of greater diameter being engagable with the outside surface of the end of the said pipe.

The bore of the coupling nut which is of greater diameter may be of a substantially constant cross section or may be tapered outwardly from the interior of the nut.

Preferably the said tubular portion of the coupling terminates in a nose tapered with an increasing diameter from the leading edge of the nose to assist in maintaining the end of the pipe on the coupling and to enable the pipe to be introduced onto the coupling with relative ease.

The tubular portions of the coupling can themselves be tapered so as to have a reducing outside diameter from adjacent the said boss to the said nose.

The coupling may include a plurality of annular ridges on said tubular portion to further assist the coupling to grip the piping.

With couplings of the invention the end of a pipe can be fully engaged onto the coupling, as will be further described, and the nut can then be rotated so as to be moved onto the exterior of the end of the pipe so that one portion of the nut engages the exterior of the piping and another portion of the nut engages the annular boss portion of the coupling.

To assist further understanding of the present invention preferred embodiments thereof which comprise the best method of performing the invention known to me will now be described with reference to the accompanying drawings, wherein.

Figure 1:
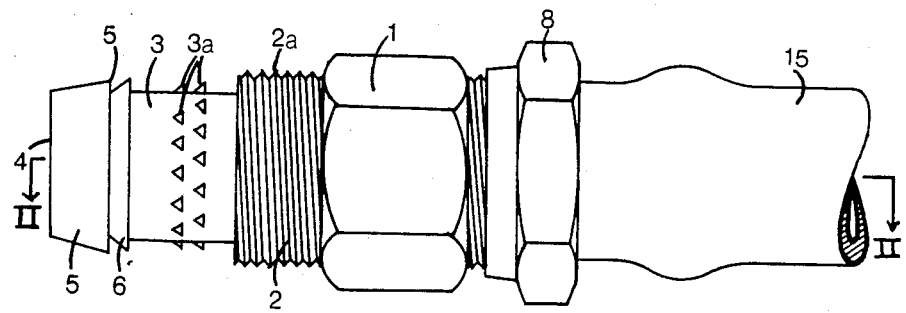
FIG. 1 is an external side view of a first embodiment coupling.

The preferred embodiment couplings shown in the drawings are all of the type suitable for joining one length of hard walled pipe to another length of such pipe. However, it is envisaged and considered obvious that these couplings can be readily adapted e.g. by having one end only formed as shown in the drawings with the other end being formed into an appropriate male or female fitting, to couple the end of a pipe to some device or apparatus. It is also envisaged that the couplings may be readily formed into a bend, a tee or any desired shape.

The preferred embodiment couplings are preferably formed from an engineering plastics material and preferably include a central section 1 which is preferably of greater thickness than the remainder of the coupling and which provides a gripping portion which has a polygonal outer surface such as that shown, to aid holding of the coupling during fitting and use. Other shapes of the outside wall comprising the gripping portion of the central section 1 of the coupling can be utilised as required. The said wall could be provided with a series of longitudinal ribs or other indentations or protrusions to enable the body of the coupling to be gripped and held. The provison of a central section 1 is preferred since it provides the coupling with a length so that if an in-service pipe should fracture, the body of the coupling will be of sufficient length to allow the ends of the pipe to be trimmed with the central section 1 of the coupling substantially compensating for the portion of the piping which is removed during the trimming process.

Extending outwardly from each side of the central section 1 is an annular boss 2, the external walls of which are each provided with a screw thread 2a. Each boss 2 extends into a tubular portion 3 of reduced diameter, over which the end of a pipe to be coupled can be engaged, and which terminates in a nose 4 bevelled as at 5 so as to have an increasing diameter from its leading edge, to form a taper of, for example, approximately 15 degrees. Other angles of bevel may be used as desired with the essential requirement being to allow the end of the piping to be coupled to be easily slid over the nose 4. The bevelled portion preferably terminates in an annular ridge such as that indicated at 5a. A number of these annular ridges may be provided as desired. In the FIGS. 1 and 2 embodiment coupling a single additional ridge 6 or a buttress shape is provided and this has a steeper bevel than the bevel 5. In the FIGS. 3 and 4 embodiment couplings a series of annular buttress shaped ridges 6 are provided on the tubular portions as shown. These additional annular ridges further assist in the retention of the end of a pipe on the tubular portion(s) 3 of the coupling. They act as a series of teeth which will tend to grip the interior wall of a pipe attached to the coupling and to thereby resist any longitudinal movement between the pipe and the coupling. They also assist in forming a liquid seal between the coupling and the pipe.

The embodiment couplings in which the additional annular ridges 6 do not extend for the entire length of each tubular portion 3 also include one or more rows of barbs, indicated at 3a in FIG. 1, spaced around the tubular portion 3, whose purpose is to prevent rotation of piping on the coupling during movement of the securing nut on to the end of a pipe to be coupled, as will be further described hereinafter. In addition it will be appreciated that the provision of these barbs 3a will assist the pipe in being gripped by and held on the coupling.

Figure 3:
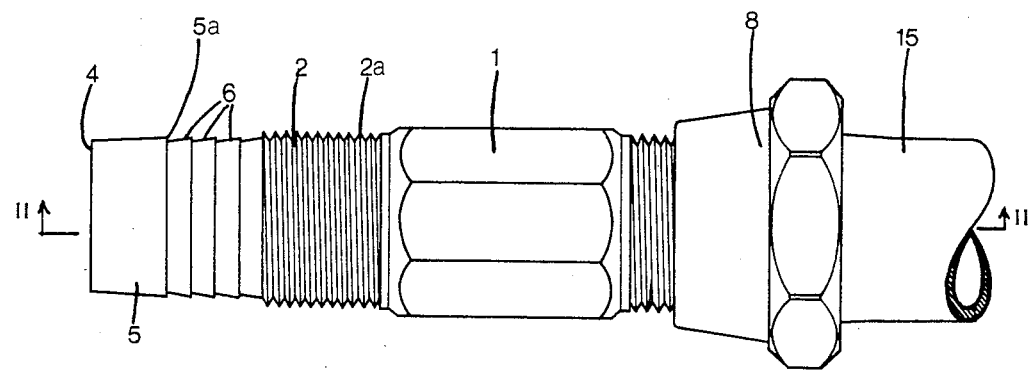
FIG. 3 is an external side view of a second embodiment coupling.
Figure 4:
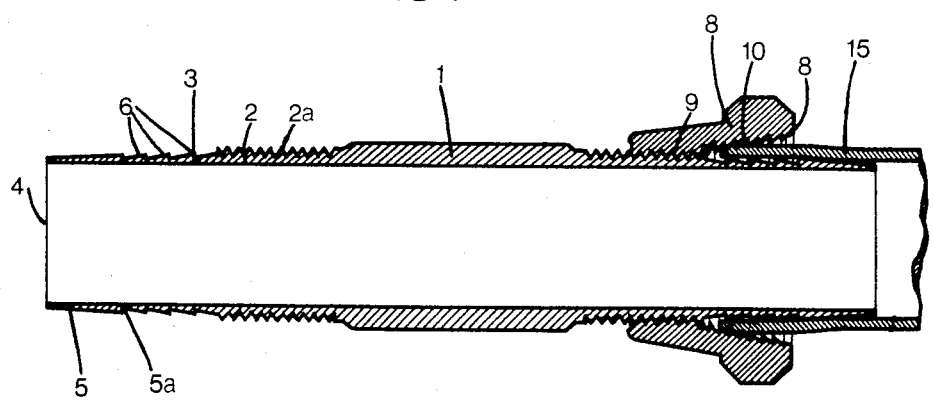
FIG. 4 is a longitudinal sectional view along the line II—II of FIG. 3.

In the FIGS. 3 and 4 embodiment couplings each tubular portion 3 is tapered and has a reducing outside diameter, or at least a reducing averaged outside diameter, from adjacent the boss 2 to the respective nose 4, and the outside diameter of the leading edge of the nose 4 is slightly less than the inside diameter of a typical polythene pipe. This will allow easy entry of the nose into the interior end of a pipe to be coupled and the coupling may, once the nose 4 has been relatively easily entered into the pipe end, be pushed firmly home so that the end of the pipe is well engaged over the tubular portion 3. Additionally, when used with a coupling nut having an outwardly tapered bore, the combined action of the tapered nut and the tapered tubular portion will tend to "squeeze" the end of a pipe connected to the coupling to assist in maintaining the pipe on the coupling. It is necessary however that the nose 4 of the coupling is sufficiently strong and consequently the thickness of the wall of the leading edge of the nose is arranged, not only to allow the nose to enter into the bore of the pipe 15, but also so that it will have the required mechanical rigidity and resistance to, for instance, crushing, in-service.

A bore 11 extends through the central section 1, bosses 2 and tubular portions 3 of the couplings as shown.

A nut 8 is carried on each of the bosses 2 (only one such nut 8 is shown in the FIGS. 1–4).

The interior of each of the coupling nuts 8 shown in the drawings is formed into two concentric bores of different diameters. The bore 9 is of a lesser diameter and is screw threaded so that the nut 8 is engagable on the screw threaded annular boss portion 2a and is rotatable thereon. As can be seen from the drawings the nut 8 is positioned on the boss 2 so that the smaller bore 9 will be adjacent the central section 1. The bore 10, which is of greater diameter, faces outwardly from the central section 1, and may be of a constant diameter with a step being formed between it and the bore 9 (not shown in the drawings), or may be tapered outwardly from the interior of the nut as shown, so that its diameter reduces to the diameter of the lesser diameter bore 9.

Figure 2:
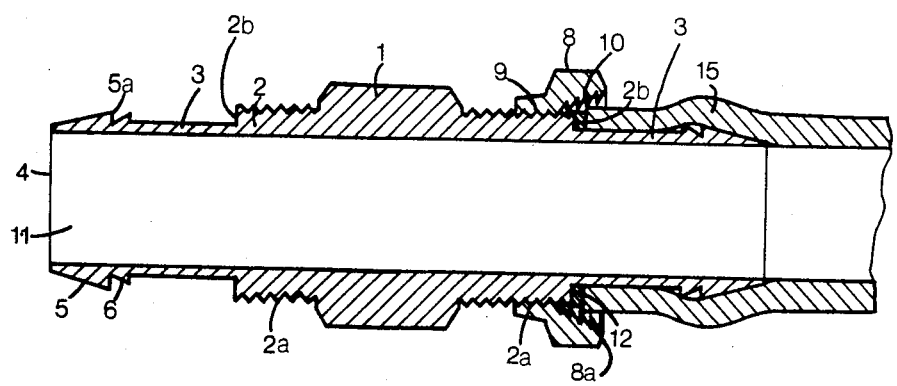
FIG. 2 is a longitudinal sectional view along the line II—II of FIG. 1.

To retain each nut 8 on the coupling, a split washer 12, which may be formed of a plastics material or other material as desired, can be placed over each tubular portion 3 (shown in FIGS. 1 and 2 only). The washer 12 has an external diameter greater than the diameter of the lesser diameter bore 9 but less than the diameter of the greater diameter bore 10. When it is desired to remove a nut 8 from the coupling the washer 12 must first be removed from the tubular section 3 and the nut 8 can be slid over the nose 4.

To connect the end of a section of pipe, such as that indicated at 15 to, for example, one end of a coupling of the invention, the nose of the coupling is entered into the interior of the end of the pipe and the pipe is pushed home onto the tubular portion 3 as earlier described, preferably until the end of the pipe 15 abuts against the shoulder 2b of the boss 2 or against the washer 12 if this is used. This ensures a positive indication of the correct placement of the end of the pipe 15 on the coupling. The nut 8 is then screwed towards the nose 4 and the forward portion 8a of the nut 8 will be guided over the exterior of the pipe 15 and will tend to clamp the end of the pipe 15 onto the tubular portion 3. The nut 8 will tend to cut or form its own thread in the end of the pipe as it is advanced.

The thread on the greater diameter bore 10 is preferably of a buttress form. In one embodiment coupling, the buttress thread shown in FIG. 4, has a taper of approximately 7½ degrees from the leading edge to the back. The thread angles may vary slightly but preferably range from 90 degrees vertical on the leading edge and 50 degrees on the trailing edge to 100 degrees negative on the leading edge and 45 degrees on the trailing edge. The most preferred thread angles are in the 90 and 100 degree negative range on the leading edge and 45 degrees on the trailing edge.

Figure 5:
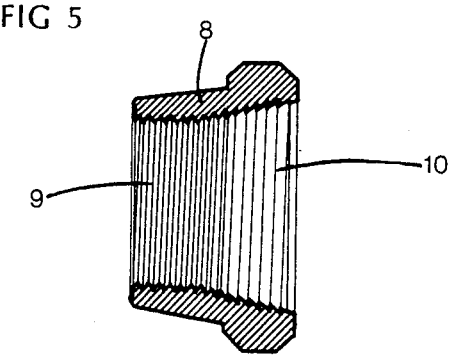
FIG. 5 is a vertical section of the coupling nut of the coupling shown in FIGS. 3 and 4.

The coupling nut shown in cross-section in FIGS. 4 and 5 also include a buttress thread as shown.

It has been found that a buttress or vertical "shark tooth" thread provides an excellent grip on the exterior surface of the end of the pipe, because as it is pushed onto, for example, a polythene pipe, the displaced polythene forms behind the thread. Thus the nut has a greater ability to withstand tension at the joint than, for example, a nut having a British Standard Pipe Thread where the displaced polythene travels ahead of the thread.

Figure 6:
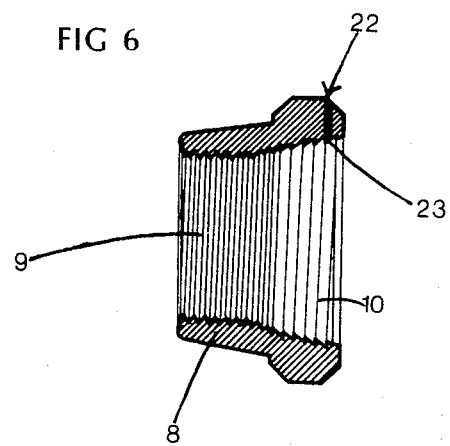
FIG. 6 is a vertical section through a modified form of coupling nut.

The nut shown in FIG. 6 includes a thread starting means, one form of which is indicated at 22. The purpose of the thread starting means is to facilitate the cutting of a thread on the outside wall of the polythene pipe as the nut is being screwed thereon, so as to ensure a correct fitting between the nut and the pipe. In the embodiment shown, the thread starting means consists of a pin 23 formed preferably of a non-corrodable material such as stainless steel, with the pin being either driven through or fixed to the wall of the nut so as to extend substantially radially inwardly as shown. The tip of the pin 23 projects from the inside wall of the nut and terminates at a height preferably approximately the same as or slightly greater than the height of the nut screw threads. The tip is suitably sharpened or shaped so as to assist in the formation of a thread on the wall of the pipe as the nut is being rotated. In use, as the nut is screwed onto the end of a pipe engaged on the coupling body the pin 23 will tend to cut a thread, or at least start a thread, in the exterior of the pipe which the nut thread can then engage in the manner earlier described.

What I claim is:

1. A pipe coupling for coupling to a hard-walled semi-rigid pipe, including a tubular portion over which the end of a pipe to be coupled may be engaged, said tubular portion including an annular boss having an external screw thread carrying a nut having an internal screw thread, on which boss the nut is rotatable so as to be movable on to the exterior of the end of a pipe engaged on said tubular portion to clamp the pipe to said tubular portion, wherein said nut comprises two concentric bores of different diameters, the bore of lesser diameter being complimentary screw threaded so as to be engagable with said screw threaded annular boss and the bore of greater diameter being tapered outwardly from the interior of the nut and being screw threaded with threads of a buttress-shark tooth form so as to be engagable with the outside surface of said pipe, the screw threads of said lesser and greater diameter bores being of the same hand and of a substantially constant pitch, said tubular portion terminating in a nose tapered with an increasing diameter from the leading edge of the nose, a plurality of annular ridges of a buttress form on said tubular portion between said nose and the said boss, said tubular portion being tapered so as to have a reducing average outside diameter from adjacent said boss to said nose; whereby as said nut is screwed onto said annular boss said buttress-shark tooth threads engage the outside surface of the pipe and cut a thread into said pipe, with the displaced pipe material forming behind the thread cut in said pipe, and the ridges on said tubular portion sealingly gripping said pipe.

2. A pipe coupling as claimed in claim 1, wherein the thread angle of said buttress-shark tooth threads is in the range 90 to 100 degrees negative on the leading edge and 45 degrees on the trailing edge.

3. A pipe coupling as claimed in claim 1, wherein said nut includes thread starting means to assist in forming a thread in the exterior of the end of a pipe.

4. A pipe coupling as claimed in claim 3, wherein said thread starting means comprises a pin extending radially from the nut at the leading portion of thread thereof.

5. A pipe coupling as claimed in claim 1, wherein the coupling is of a type comprising a central section providing a gripping portion, from each end of which extends a said tubular portion and a said annular boss carrying a said coupling nut, the coupling being of a type suitable for joining one length of pipe to another length of pipe.

* * * * *